United States Patent [19]

Kametani

[11] Patent Number: 5,091,948
[45] Date of Patent: Feb. 25, 1992

[54] SPEAKER RECOGNITION WITH GLOTTAL PULSE-SHAPES

[75] Inventor: Jun Kametani, Tokyo, Japan

[73] Assignee: NEC Corporation, Tokyo, Japan

[21] Appl. No.: 493,118

[22] Filed: Mar. 15, 1990

[30] Foreign Application Priority Data

Mar. 16, 1989 [JP] Japan .................................. 1-62265

[51] Int. Cl.$^5$ .............................................. G10B 9/06
[52] U.S. Cl. ........................................ 381/42; 381/41
[58] Field of Search .................................... 381/41–46; 364/513.5

[56] References Cited

U.S. PATENT DOCUMENTS

| | | | |
|---|---|---|---|
| 3,456,080 | 7/1969 | Torre | 381/42 |
| 3,466,394 | 9/1969 | French | 381/42 |
| 3,700,815 | 10/1972 | Doddington et al. | 381/42 |
| 3,989,896 | 11/1976 | Reitboeck | 381/42 |
| 4,403,114 | 9/1983 | Sakoe | 381/42 |
| 4,581,755 | 4/1986 | Sakoe | 381/42 |

OTHER PUBLICATIONS

Rabiner et al., "An Algorithm for Determining the Endpoints of Isolated Utterances", Bell System.

Primary Examiner—Dale M. Shaw
Assistant Examiner—Michelle Doerrler
Attorney, Agent, or Firm—Foley & Lardner

[57] ABSTRACT

A speaker recognition system including a voiced sound detector for detecting a voiced sound sample from an input utterance of a speaker. A prefiltering circuit derives from the voiced sound sample a compensation parameter indicating a decaying characteristics of a high frequency component of the voiced sound sample and compensates for the voiced sound sample in accordance with the compensation parameter. An estimation circuit is provided for estimating a glottal excitation source pulse of the vocal tract system of the speaker from the compensated voiced sound sample. A glottal pulse-shape is simulated from the estimated glottal excitation source pulse using the compensation parameter detected by the prefiltering circuit. The simulated glottal pulse-shape is analyzed to determine vocal features of the speaker, and a decision is made whether the determined features coincide with reference features stored in a pattern memory.

16 Claims, 4 Drawing Sheets

INPUT VOICED SAMPLES $x_i$;

WEIGHTED DIFFERENTIAL (COMPENSATED) SAMPLES $y_i$;

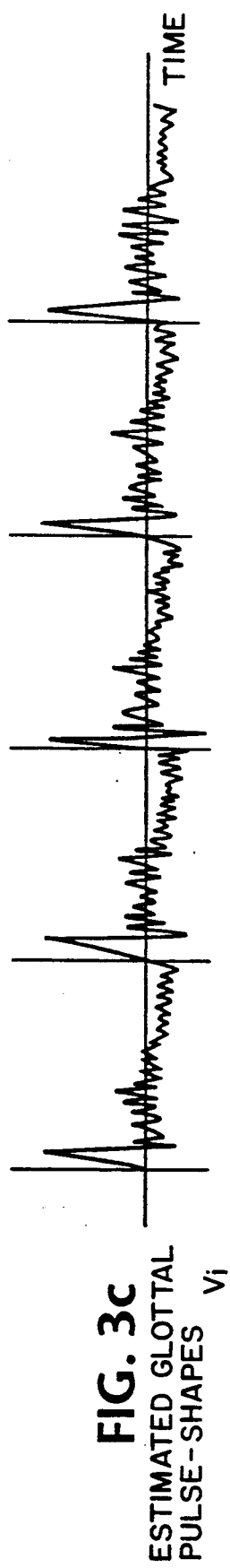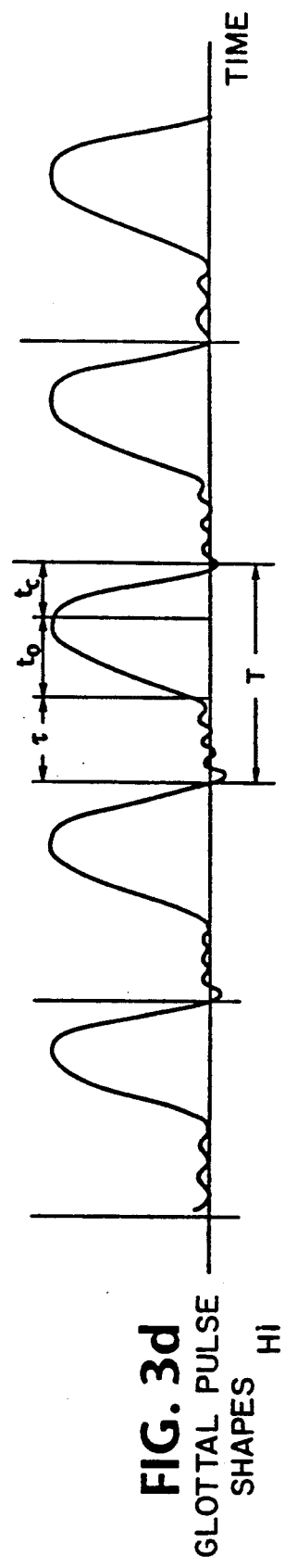
FIG. 3c
ESTIMATED GLOTTAL
PULSE-SHAPES $V_i$
FIG. 3d
GLOTTAL PULSE
SHAPES $H_i$

SPEAKER RECOGNITION WITH GLOTTAL PULSE-SHAPES

BACKGROUND OF THE INVENTION

The present invention relates to speaker recognition techniques using glottal pulse shapes.

It is known to use glottal pulse-shapes extracted from talker's voice as a unique key to identify the voice pattern of individuals. With a conventional speaker recognition system for multiple designated speakers, the beginning and end points of an utterance are detected by an endpoint detection unit. This is usually done by detecting the power level of the voice input and identifying it as a voice signal if it exceeds a prescribed threshold. Once the beginning and end of the utterance has been found, a series of measurements are made to provide feature parameters such as cepstrum coefficients, linear prediction coefficients and/or auto-correlation coefficients. While these parameters contain articulation information which is relevant to speaker identity, they further contain speaker independent information such as phonemes. The conventional speaker recognition system enhances its reliability by additionally employing speaker identifying keywords, or digitized spoken words or phrases, stored in a memory. In response to a voice input, the memory is searched to detect a keyword which is combined with a stored voice pattern and to detect a match with the extracted feature using a dynamic programming technique by which the time scale of a reference utterance is dynamically warped so that significant events of the input utterance line up with the corresponding significant events in the reference utterance.

SUMMARY OF THE INVENTION

It is therefore an object of the present invention to provide a speaker recognition system having a high reliability of speaker recognition without using speaker-specific keywords.

According to the present invention, there is provided a speaker recognition system which comprises a voiced sound detector for detecting a voiced sound sample from an input utterance of a speaker. A prefiltering circuit is provided for deriving from the voiced sound sample a compensation parameter indicating the decaying characteristic of a high frequency component of the voiced sound sample and compensating for the voiced sound sample in accordance with the compensation parameter. An estimation circuit is provided for estimating a glottal excitation source pulse of the vocal tract system of the speaker from the compensated voiced sound sample. A glottal pulse-shape is simulated from the estimated glottal excitation source pulse using the compensation parameter and supplied to a decision circuit for analyzing the simulated glottal pulse-shape to determine the vocal features of the speaker and making a decision whether the determined features coincide with reference features stored in a pattern memory.

Since glottal pulse-shapes contain little or no phonemes (a speaker independent parameter), speakers can be recognized with a high degree of discrimination than with the prior art keyword system.

More specifically, the voiced sound detector detects a voiced sound sample $X_i$ from the input utterance, where i is an integer identifying the sample, and the prefiltering circuit derives from the voiced sound sample a compensation coefficient K indicating the decaying characteristic of the high frequency component and compensates for the voiced sound sample in accordance with the coefficient K to produce an output sample $Y_i$ represented by a relation $Y_i = X_i - K \cdot X_{i-1}$. The estimation circuit estimates a glottal excitation source pulse $U_i$ of the vocal tract system of the speaker from the compensated voiced sound sample $Y_i$, the estimated glottal excitation source pulse $U_i$ being represented by a relation $$U_i = Y_i - \sum_{j=1}^{n} (a_j \cdot Y_{i-j}),$$

where $a_j$ indicates a linear prediction coefficient of the j-th order and n is an integer. The glottal pulse-shape $H_i$ is simulated from the estimated glottal excitation source pulse $U_i$ in accordance with the compensation coefficient K so that the simulated glottal pulse-shape $H_i$ is represented by a relation $H_i = (U_i + K \times U_{i-1}) + \beta \times (U_{i-1} + K \cdot U_{i-2})$, where $\beta$ is a constant smaller than unity.

BRIEF DESCRIPTION OF THE DRAWINGS

The present invention will be described in further detail with reference to the accompanying drawings, in which:

FIGS. 3a to 3d are waveforms generated in various parts of the system of FIG. 1.

DETAILED DESCRIPTION

Figure 1:
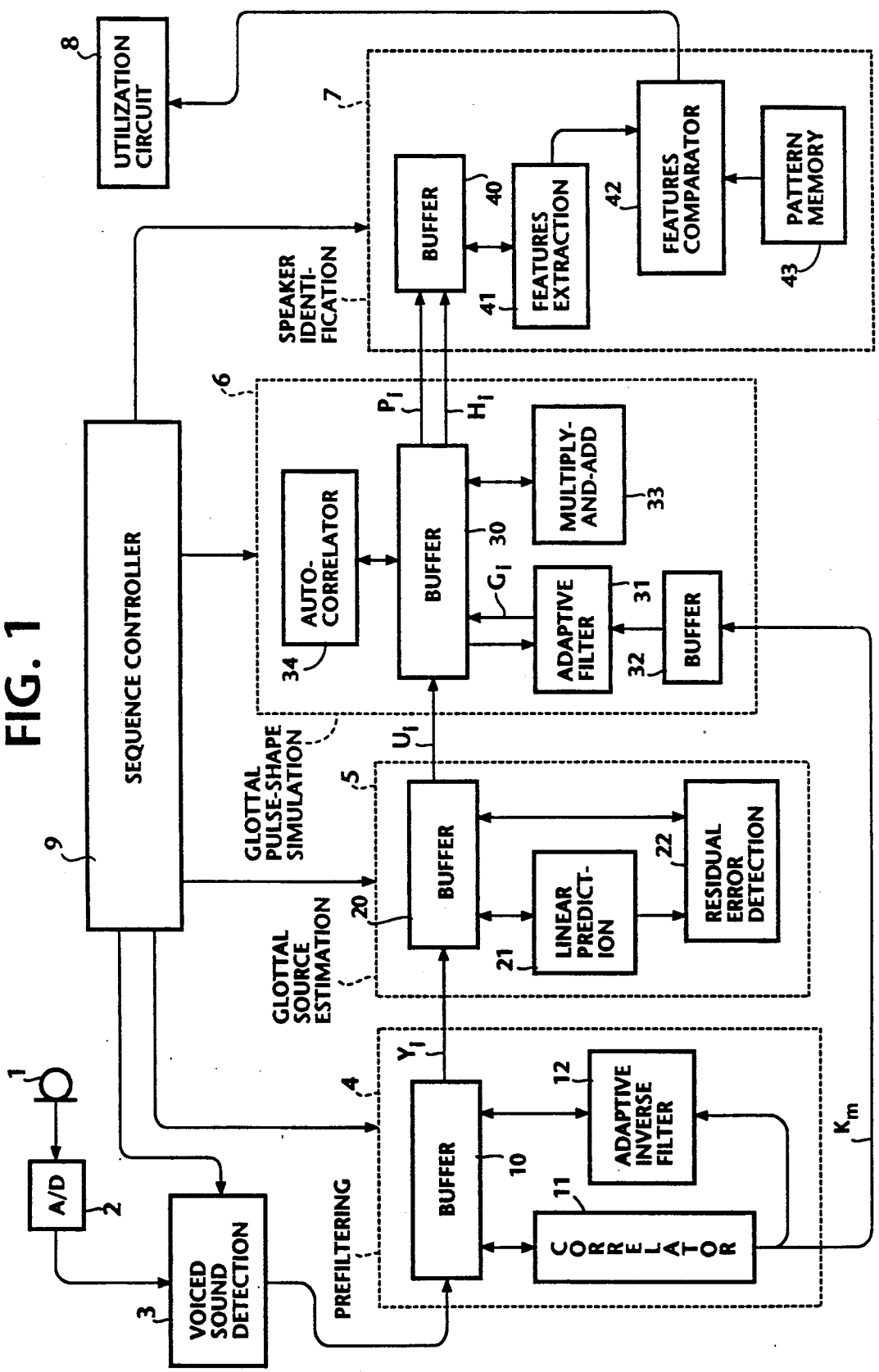
FIG. 1 is a block diagram of a speaker recognition system of the present invention.

Referring now to FIG. 1, the speaker recognition system of the present invention generally comprises an analog-to-digital converter 2, a voiced sound detection circuit 3, a prefiltering circuit 4, a glottal source estimation circuit 5, a glottal pulse-shape simulation circuit 6, a speaker identification circuit 7, a utilization circuit 8, and a sequence controller 9 which provides overall timing control for the system. Analog-to-digital converter 2 digitizes the analog waveform of a sound signal supplied directly from a microphone 1 or by way of a telephone line, not shown, at a sampling rate of 10 kHz, for example. Digital samples from A/D converter 2 are supplied to voiced sound detection circuit 3.

Figure 2:
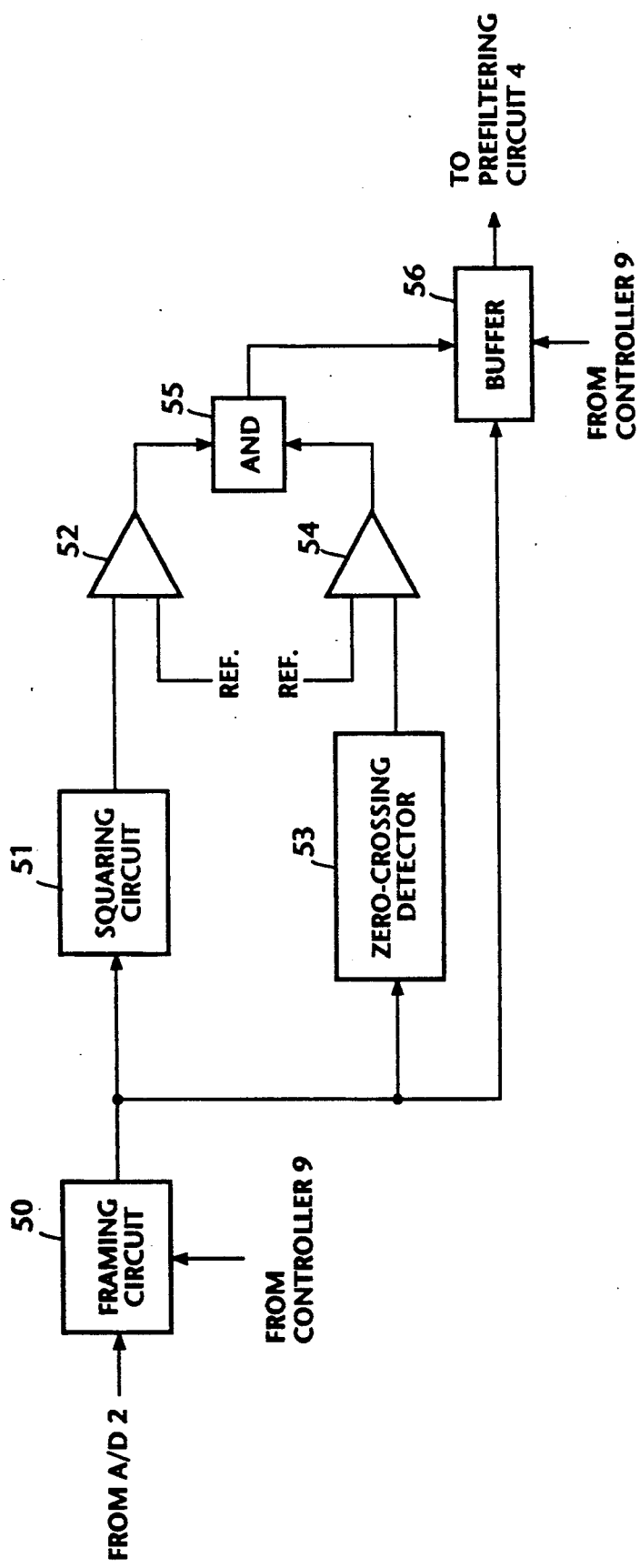
FIG. 2 shows details of the voiced sound detection circuit of FIG. 1.
Figure 3A:
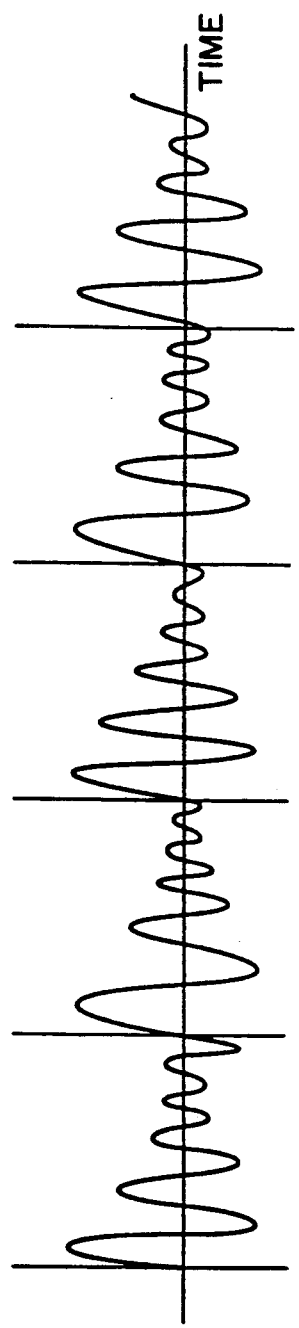

As shown in FIG. 2, voiced sound detection circuit 3 comprises a framing circuit 50 which segments the time scale of input by organizing the input samples in response to timing pulses supplied from sequence controller 9 into a series of 100-ms frames each containing 1000 digital samples $X_i$, for example. A squaring circuit 51 is connected to the output of the framing circuit 50 to produce a signal representative of the average power of the samples in each frame, which is applied to a comparator 52 for comparison with a reference value. The output of framing circuit 50 is further applied to a zero-crossing detector 53 and a buffer 56. Zero-crossing detector 53 counts zero-crossings of the samples in each frame and supplies its output to a comparator 54 for making a comparison with a reference count. If the average power of a given frame is higher than the reference value, comparator 52 produces a logic 1 and if the number of detected zero-crossings is smaller than the reference count, comparator 54 produces a logic 1. The outputs of comparators 52 and 54 are applied to an AND gate 55 to supply an enable pulse to buffer 56 indicating that the input frame is a voiced sound. A typical waveform of such voiced sound is shown in FIG. 3a.

As opposed to the voice signal detected by the endpoint detection system of the prior art, the voiced sound so detected by the circuit 3 contains glottal pulse waves generated by the oscillatory movement of the vocal cord of a speaker as well as noise components other than pitch harmony. The pitch frequency of glottal pulse waves, the slope and bends of the spectral contour and the noise components contained in the output of circuit 3 are the unique characteristics that identify a particular person among an ensemble of persons.

When buffer 56 is enabled, ten frames of voiced sound are supplied in sequence from buffer 56 to prefiltering circuit 4 in response to a timing pulse from sequence controller 9. Due to the spectral characteristic of glottal pulse waves and the radiation effects of lips, the amplitude of the high-frequency components of the voiced sound decreases with frequency at a rate approximately −10 dB/oct. This high-frequency decaying characteristic results in a concentration of acoustic energies in the lower frequency range of the spectrum and lowers the accuracy of a vocal tract transfer function which will be obtained later. To ensure a satisfactory level of computation accuracy, the prefiltering circuit 4 provides high-frequency compensation to equalize the spectrum characteristic of the voiced sound input from circuit 3.

Figure 4:
FIG. 4 is a schematic diagram of a model of a voice generation mechanism.

The present invention is based on a well known voice generation model which is approximated by a series circuit of a source model, a vocal tract model and a radiation model as shown in FIG. 4. It is recognized that double differentiations of a voiced glottal pulse wave results in a periodic pulse. The source model is based on this fact to provide double integrations on periodic glottal excitation pulses $U_i$ to approximate glottal pulse waves $H_i$ which are to be supplied to the vocal tract model. The vocal tract model is approximated by a vocal tract filter, and the radiation model approximates the radiation pattern of lips and is equivalent to a differential circuit. These models are considered to be "linearly" coupled, and therefore, the source model and the radiation models can be approximated by a "single" integration circuit.

Prefiltering circuit 4 comprises a buffer 10, a correlator 11 and an adaptive inverse filter 12 which corresponds to the inverse filter of the source-radiation model. Ten frames of the voiced sound from detection circuit 3 are stored into buffer 10 for temporary storage. The stored frames are successively supplied to correlator 11 to detect a coefficient $K_m$ of first-order auto-correlation between successive digital samples $X_i$ in current frame $F_m$. The auto-correlation coefficient $K_m$ is supplied to adaptive inverse filter 12 to which the digital samples of each frame are successively supplied from buffer 10. Adaptive inverse filter 12 multiplies each sample with the coefficient $K_m$ to produce a weighted sample $K_m \times X_{i-1}$ and derives a difference between the weighted sample and a subsequent sample $X_i$ to generate a weighted differential sample $Y_i$ of the form:

$$Y_i = X_i - K_m \cdot X_{i-1}. \tag{1}$$

Figure 3B:
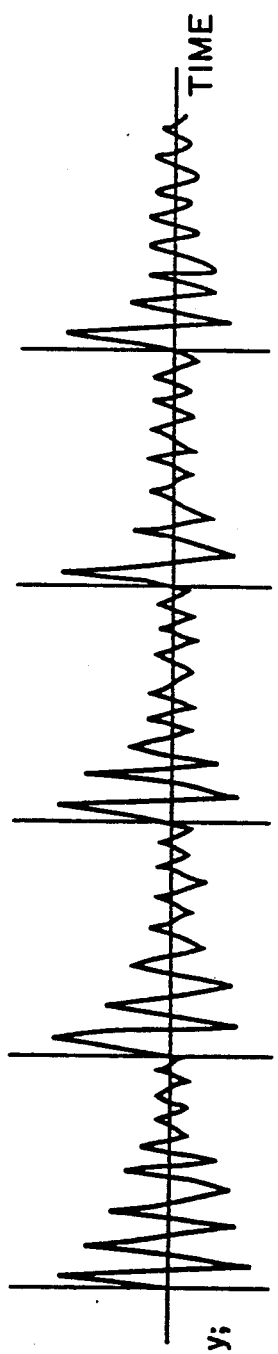

The weighted differential sample $Y_i$ is stored into buffer 10 to recover a frame $F'_m$ containing weighted differential samples $Y_i$. A typical waveform of the sample $Y_i$ is shown in FIG. 3b.

In response to a timing pulse from sequence controller 9, the output signal $Y_i$ of prefiltering circuit 4 is supplied to glottal source excitation estimation circuit 5, which comprises a buffer 20 for temporarily storing samples $Y_i$, a linear prediction circuit 21 and a residual error detector 22. Linear prediction circuit 21 and residual error detector 22 combine to form an inverse filter of the vocal tract function. From the stored samples $Y_i$, the linear prediction circuit 21 derives the following polynomial of linear prediction coefficients:

$$\sum_{j=1}^{n} (a_j \cdot Y_{i-j}) \tag{2}$$

where $a_j$ represents the j-th order of linear prediction coefficient for each frame, and n is an integer typically in the range between 8 and 14. Specifically, linear prediction circuit 21 derives the linear prediction coefficient $a_j$ from whole samples of each frame stored in buffer 20 and multiplies samples $Y_{i-j}$ with the coefficient $a_j$ and provides a total of the products $(a_j \times Y_{i-j})$ for $i = 1$ to $j = n$. The output of linear prediction circuit 21 is supplied to residual error detector 22 which detects a residual error between the output of linear prediction circuit 21 and a stored sample $Y_i$ to produce an output sample $U_i$ (see FIG. 3c), the difference being stored back into buffer 20. Thus, the output sample $U_i$ which approximates the periodic glottal excitation pulse is given by:

$$U_i = Y_i - \sum_{j=1}^{n} (a_j \cdot Y_{i-j}) \tag{3}$$

Samples $U_i$ are supplied from buffer 20 to glottal pulse-shape simulation circuit 6 in response to a timing signal from sequence controller 9.

Glottal pulse shape simulation circuit 6 comprises a buffer 30 for temporarily storing samples $U_i$, an adaptive filter 31, a buffer 32 for storing first-order auto-correlation coefficients $K_m$ from correlator 11, and a multiply-and-add circuit 33. Adaptive filter 31, which represents the filter of the source-radiation model, is connected to buffers 30 and 32 to provide the function of multiplying a sample $U_{i-1}$ with a coefficient $K_m$ to produce a weighted sample $(K_m \times U_{i-1})$ and adding a sample $U_i$ to the weighted sample $K_m \times U_{i-1}$, producing an output sample $G_i$ of the form:

$$G_i = U_i + K_m \cdot U_{i-1} \tag{4}$$

The output samples $G_i$ are stored back into buffer 30 and retrieved by multiply-and-add circuit 33 by which sample $G_{i-1}$ is multiplied with coefficient $\beta$ in the range between 0.9 to 0.99, producing a weighted sample $(\beta \times G_{i-1})$. This weighed sample is summed with a previous sample $G_i$ to produce a glottal pulse-shape $H_i$ of the form:

$$H_i = G_i + \beta \cdot G_{i-1} \tag{5}$$

Since the glottal pulse wave $H_i$ can be derived from double integrations of glottal excitation pulses $U_i$ as mentioned earlier, the adaptive filter 31 is equivalent to the function of first integration and the multiply-and-add circuit 33 is equivalent to the function of second integration. Glottal pulse shape simulation circuit 6 further includes an auto-correlator 34 which detects auto-correlation between input digital samples $U_i$ to produce a digital sample $P_i$ representative of the pitch period T of glottal pulse-shape samples $U_i$. Samples $H_i$ and $P_i$ are stored back into buffer 30 and delivered to speaker identification circuit 7 in response to a timing pulse from sequence controller 9. A typical waveform of glottal pulse-shape $H_i$ is shown in FIG. 3d.

Speaker identification circuit 7 includes a buffer 40 for storing samples $H_i$ and $P_i$, a features extraction circuit 41, a features comparator 42 and a pattern memory 43. Features extraction circuit 41 analyzes the samples $H_i$ stored in buffer 40 to detect the glottal closure interval $\tau$, opening time $t_o$ and closing time $t_c$ (see FIG. 3d) and derives ratios $R_1 = \tau/T$ and $R_2 = t_o/t_c$. The average and deviation values of the extracted features are determined and supplied to comparator 42 in which they are compared with a set of reference parameters stored in pattern memory 43 during a recording mode of the system. These reference parameters represent the average and deviation values of features T, $R_1$ and $R_2$ of a designated person. Comparator 42 determines distances between the corresponding items. If the detected distances are within specified range, decision is made that the speaker's voice matches a corresponding voice pattern. This fact is communicated to a utilization circuit 8.

Since the speaker recognition system of this invention detects glottal pulse-shapes containing few or no phonemes (speaker independent parameter) and extracts those parameters uniquely characterizing a speaker's voice pattern, speakers can be recognized with a higher level of discrimination than with the prior art keyword system.

The foregoing description shows only one preferred embodiment of the present invention. Various modifications are apparent to those skilled in the art, however, without departing from the scope of the present invention which is only limited by the appended claims. Therefore, the embodiment shown and described is only illustrative, not restrictive.

What is claimed is:

1. A speaker recognition system comprising:
   voiced sound detecting means for detecting a voiced sound sample from an input utterance of a speaker;
   prefiltering means for deriving from said voiced sound sample a compensation parameter indicating a decaying characteristic of a high frequency component of said voiced sound sample and compensating for the high frequency component of said voiced sound sample in accordance with said parameter to produce a compensated voiced sound sample;
   estimating means for estimating a glottal excitation source pulse of the vocal tract system of said speaker from said compensated voiced sound sample;
   simulating means for simulating a glottal pulse-shape from said estimated glottal excitation source pulse in accordance with said compensation parameter;
   a memory for storing reference features of designated persons; and
   decision means for analyzing said simulated glottal pulse-shape to determine vocal features of said speaker and making a decision whether the determined features coincide with reference features stored in said memory and making a determination whether said speaker coincides with one of said designated speakers based on said decision.

2. A speaker recognition system as claimed in claim 1, wherein said voiced sound detecting means comprises:
   means for digitizing input utterances into digital samples;
   means for squaring said digital samples to generate a sample indicative of a power level of said digital samples;
   means for making a first decision if said power level is higher than a prescribed threshold;
   means for counting zero-crossings of said digital samples to produce a count of zero-crossings;
   means for making a second decision if the count of zero-crossings is smaller than a prescribed count; and
   means for classifying said digital samples as a voiced sound if both of said first and second decisions are made, and supplying said classified digital samples to said prefiltering means.

3. A speaker recognition system as claimed in claim 2, wherein said prefiltering means comprises:
   an auto-correlator for detecting auto-correlation between successive ones of the classified digital samples, the detected auto-correlation being said compensation parameter; and
   adaptive inverse filtering means for adaptively inverse-filtering said classified digital samples according to the detected auto-correlation to produce said compensated voiced sound sample.

4. A speaker recognition system as claimed in claim 3, wherein said estimating means comprises:
   linear prediction means for generating a polynomial of linear prediction coefficients from the output of said inverse filtering means; and
   residual error detection means for detecting a residual error between said polynomial of linear prediction coefficients from said linear prediction means and said compensated voiced sound sample from said inverse filtering means.

5. A speaker recognition system as claimed in claim 4, wherein said simulating means comprises:
   adaptive filtering means for filtering said residual error from said residual error detection means according to the auto-correlation detected by said auto-correlator; and
   means for summing successive ones of the compensated voiced sound sample from said adaptive inverse filtering means to produce a sample as said simulated glottal pulse-shape.

6. A speaker recognition system as claimed in claim 1, wherein said reference features for each of said designated persons include $R_1 = \tau/T$ and $R_2 = t_o/t_c$ obtained from a glottal pulse-shape of the designated person, where $\tau$ is a glottal closure interval, T is a pitch period, $t_o$ is an opening time and $t_c$ is a closing time, and wherein said decision means determines $R'_1$ and $R'_2$ of said speaker from a glottal pulse-shape of said speaker and determines whether the $R'_1$ and $R'_2$ coincide respectively with the $R_1$ and $R_2$, where $R'_1 = \tau'/T'$ and $R'_2 = t'_o/t'_c$, where $\tau'$ is a glottal closure interval, T' is a pitch period, $t'_o$ is an opening time and $t'_c$ is a closing time.

7. A speaker recognition system comprising:
   voiced sound detecting means for detecting a voiced sound sample $X_i$ from an input utterance of a speaker, where i is an integer identifying said sample;

prefiltering means for deriving from said voiced sound sample a compensation coefficient K indicating a decaying characteristic of a high frequency component of said voiced sound sample and compensating for the high frequency component of said voiced sound sample in accordance with said coefficient K to produce an output sample $Y_i$ represented by a relation $Y_i = X_i - K \cdot X_{i-1}$;

linear prediction means for producing a linear prediction coefficient $a_j$ from a plurality of said samples $Y_i$;

estimating means for estimating a glottal excitation source pulse $U_i$ of the vocal tract system of said speaker from said sample $Y_i$, said estimated glottal excitation source pulse $U_i$ being represented by a relation $$U_i = Y_i - \sum_{j=1}^{n} (a_j \cdot Y_{i-j}),$$

where $a_j$ indicates a j-th order of the linear prediction coefficient and n is an integer;

simulating means for simulating a glottal pulse-shape $H_i$ from said estimated glottal excitation source pulse $U_i$ in accordance with said compensation coefficient so that said simulated glottal pulse-shape $H_i$ is represented by a relation $H_i = (U_i + K \cdot U_{i-1}) + \beta \cdot (U_{i-1} + K \cdot U_{1-2})$, where $\beta$ is a constant smaller than unity;

a memory for storing reference features of designated persons; and decision means for analyzing said simulated glottal pulse-shape $H_i$ to determine vocal features of said speaker and making a decision whether the determined features coincide with reference features stored in said memory and making a determination whether said speaker is a designated speaker based on said decision.

8. A speaker recognition system as claimed in claim 7, wherein said reference features for each of said designated persons include $R_1 = \tau/T$ and $R_2 = t_o/t_c$ obtained from a glottal pulse-shape of the designated person, where $\tau$ is a glottal closure interval, T is a pitch period, $t_o$ is an opening time and $t_c$ is a closing time, and wherein said decision means determines $R'_1$ and $R'_2$ of said speaker from a glottal pulse-shape of said speaker and determines whether the $R'_1$ and $R'_2$ coincide respectively with the $R_1$ and $R_2$, where $R'_1 = \tau'/T'$ and $R'_2 = t'_o/t'_c$, where $\tau'$ is a glottal closure interval, T' is a pitch period, $t'_o$ is an opening time and $t'_c$ is a closing time.

9. A method for recognizing a speaker comprising:
a) detecting a voiced sound sample from an input utterance of a speaker;
b) deriving from said voiced sound sample a compensation parameter indicating a decaying characteristic of a high frequency component of said voiced sound sample and compensating for the high frequency component of said voiced sound sample in accordance with said parameter to produce a compensated voiced sound sample;
c) estimating a glottal excitation source pulse of the vocal tract system of said speaker from said compensated voiced sound sample;
d) simulating a glottal pulse-shape from said estimated glottal excitation source pulse in accordance with said compensation parameter; and
e) analyzing said simulated glottal pulse-shape to determine vocal features of said speaker and making a decision whether the determined features coincide with reference features of each one of a plurality of designated persons and determining whether said speaker coincides with one of said designated speakers based on said decision.

10. A method as claimed in claim 9, wherein said reference features for each of said designated persons include $R_1 = \tau/T$ and $R_2 = t_o/t_c$ obtained from a glottal pulse-shape of the designated person, where $\tau$ is a glottal closure interval, T is a pitch period, $t_o$ is an opening time and $t_c$ is a closing time, and wherein said decision means determines $R'_1$ and $R'_2$ of said speaker from a glottal pulse-shape of said speaker and wherein the step (e) determines whether the $R'_1$ and $R'_2$ coincide respectively with the $R_1$ and $R_2$, where $R'_1 = \tau'/T'$ and $R'_2 = t'_o/t'_c$, where $\tau'$ is a glottal closure interval, T' is a pitch period, $t'_o$ is an opening time and $t'_c$ is a closing time.

11. A method as claimed in claim 9, wherein step (a) comprises:
digitizing input utterances into digital samples;
squaring said digital samples to generate a sample indicative of a power level of said digital samples;
making a first decision if said power level is higher than a prescribed threshold;
counting zero-crossings of said digital samples to produce a count of zero-crossings;
making a second decision if the count of zero-crossings is smaller than a prescribed count; and
classifying said digital samples as a voiced sound if both of said first and second decisions are made.

12. A method as claimed in claim 11, wherein the step (b) comprises:
detecting auto-correlation between successive ones of the classified digital samples, the detected auto-correlation being said compensation parameter; and
adaptively inverse-filtering said classified digital samples according to the detected auto-correlation.

13. A method as claimed in claim 12, wherein the step (c) comprises:
generating a sample representative of polynomial of linear prediction coefficients from said inversely filtered digital samples; and
detecting a residual error between said polynomial representative sample and said inversely filtered sample.

14. A method as claimed in claim 13, wherein the step (d) comprises:
adaptively filtering said residual error according to the autocorrelation detected by the step (b); and
summing successive ones of said adaptively filtered samples to produce a sample as said simulated glottal pulse-shape.

15. A method for recognizing a speaker comprising:
a) detecting a voiced sound sample $X_i$ from an input utterance of a speaker, where i is an integer identifying said sample;
b) deriving from said voiced sound sample a compensation coefficient K indicating a decaying characteristic of a high frequency component of said voiced sound sample and compensating for the high frequency component of said voiced sound sample in accordance with said coefficient K to produce an output sample $Y_i$ represented by a relation $Y_i = X_i - \cdot X_{i-1}$;

c) producing a linear prediction coefficient $\alpha_i$ from a plurality of said samples $Y_i$;

d) estimating a glottal excitation source pulse $U_i$ of the vocal tract system of said speaker from said samples $Y_i$, said estimated glottal excitation source pulse $U_i$ being represented by a relation $$U_i = Y_i - \sum_{j=1}^{n} (\alpha_j \cdot Y_{i-j}),$$

where $\alpha_j$ indicates a j-th order of a linear prediction coefficient and n is an integer;

e) simulating a glottal pulse-shape $H_i$ from said estimated glottal excitation source pulse $U_i$ in accordance with said compensation coefficient so that said simulated glottal pulse-shape $H_i$ is represented by a relation $H_i = (U_i + K \cdot U_{i-1}) + \beta \cdot (U_{i-1} + K \cdot U_{i-2})$, where $\beta$ is constant smaller than unity;

f) analyzing said simulated glottal pulse-shape $H_i$ to determine vocal features of said speaker and making a decision whether the determined features coincide with reference features of each one of a plurality of designated persons and g) making a determination whether said speaker is a designated speaker based on the decision of step (f).

16. A method as claimed in claim 15, wherein said reference features for each of said designated persons include $R_1 = \tau/T$ and $R_2 = t_o/t_c$ obtained from a glottal pulse-shape of the designated person, where $\tau$ is a glottal closure interval, T is a pitch period, $t_o$ is an opening time and $t_c$ is a closing time, and wherein the step (f) determines $R'_1$ and $R'_2$ of said speaker from a glottal pulse-shape of said speaker and determines whether the $R'_1$ and $R'_2$ coincide respectively with the $R_1$ and $R_2$, where $R'_1 = \tau'/T'$ and $R'_2 = t'_o/t'_c$, where $\tau'$ is a glottal closure interval, T' is a pitch period, $t'_o$ is an opening time and $t'_c$ is a closing time.

* * * * *